United States Patent [19]

Young

[11] Patent Number: 4,858,995
[45] Date of Patent: Aug. 22, 1989

[54] ARM REST FOR MOTOR VEHICLE CONSOLE

[76] Inventor: Douglas D. Young, 110 N. Sunset Cir., Hopkinsville, Ky. 42240

[21] Appl. No.: 200,059

[22] Filed: May 27, 1988

[51] Int. Cl.⁴ .............................................. A47C 7/54
[52] U.S. Cl. .................................... 297/411; 297/227
[58] Field of Search .............. 297/411, 412, 416, 227, 297/219, 194; 248/118; 108/47

[56] References Cited

U.S. PATENT DOCUMENTS

| | | | |
|---|---|---|---|
| 1,650,385 | 11/1927 | Payton | 297/412 X |
| 1,890,102 | 12/1932 | Urquhart | 297/216 X |
| 3,074,762 | 1/1963 | Kris | 297/416 |
| 3,311,408 | 3/1967 | Sarvas | 297/218 |
| 3,428,357 | 2/1969 | Lueck | 297/411 X |
| 3,603,639 | 9/1971 | Wilson | 297/219 |
| 3,634,925 | 1/1972 | Van Loo | 297/227 |
| 4,195,880 | 4/1980 | Henkhaus | 297/194 |
| 4,521,056 | 6/1985 | Lindenmuth | 248/118 |

FOREIGN PATENT DOCUMENTS 744618  2/1956  United Kingdom ............... 297/227

Primary Examiner—Francis K. Zugel
Attorney, Agent, or Firm—Harrington A. Lackey

[57] ABSTRACT

A portable arm rest for the center console of a motor vehicle between a pair of seats including an elongated encased block of cushion material having a pair of wing flaps depending from opposite sides of the arm rest member and adapted to depend on opposite sides of the center console when the arm rest is in its operative position, the wing flaps being weighted to hold the arm rest member in its operative position.

2 Claims, 1 Drawing Sheet

ARM REST FOR MOTOR VEHICLE CONSOLE

BACKGROUND OF THE INVENTION

This invention relates to an arm rest for a motor vehicle, and more particularly to a portable weighted arm rest for a motor vehicle.

In certain motor vehicles, such as pickup trucks, and particularly the 1982-1987 models S-10 Chevrolet "Blazer" and the S-15 GMC "Jimmy", an elongated center console projects upward between the front seats. However, the top surface of the console is relatively hard, and furthermore does not rise to an elevation which renders it comfortable to function as n arm rest for the occupant of either of the front seats of the vehicle.

Of course, many motor vehicles, such as passenger automobiles have center arm rests between the front seats which are adapted to pivot between an upright inoperative position and a lower operative position between the seats to function as an arm rest. However, these arm rests are formed as a permanent part of each of the vehicles.

The Gorman U.S. Pat. No. 2,524,659 to discloses a portable seat arm rest adapted to fit upon a bench-type seat of a passenger motor vehicle. The arm rest member a block of cushion material contained within a covering 17 provided with a rear projecting, hook-shaped wire member 14-15 adapted to fit between the seat and the back of he seat in order to hold the arm rest in position.

The Roudybush et al U.S. Pat. No. 4,331,360 discloses an airplane passenger seat arm rest having a resilient cap of a rather sophisticated construction.

The Harmand U.S. Pat. No. 4,500,130 a pair of vehicle seats having a center console between the seats, with permanent padding of various configurations affixed to the sides of the console.

The Zapf U.S. Pat. No. 3,951,453 discloses weighted arm cushions adapted to be placed in various positions upon cushion seat members which are articles of household furniture.

The Larkin U.S. Pat. No. 3,109,537 discloses a waste receptacle having a pair of weighted wing flap members adapted to straddle the tunnel hump in a motor vehicle.

Both of the Gregg, Jr. U.S. Pat. Nos. 3,331,494 and 3,804,233 disclose specialized article holding trays having weighted wing flaps adapted to straddle and fit over the tunnel hump of a motor vehicle.

SUMMARY OF THE INVENTION

It is therefore an object of this invention to provide an elongated cushioned arm rest which is portable and uniquely adapted to fit over and straddle the elongated center console between the front seats of a motor vehicle, and particularly in the cab of a pickup truck.

Another object of this invention is to provide a motor vehicle arm rest having a pair of weighted depending wing flap members affixed to the sides of an elongated cushioned arm rest member for fitting upon the center console of a motor vehicle with the wing flap members depending along the sides of the console in order to partially cover the sides of the console, as well as to hold the arm rest member in position upon the console.

Another object of this invention is to provide an arm rest member for resting upon the center console of a motor vehicle provided with a pair of side depending weighted wing flap members in which the rear portion of each wing flap member is wider and deeper than the corresponding front portions to better conform to the contour of the declining seats and to permit free passage of the seat belts.

A further object of this invention is to provide an arm rest in which the arm rest member consists of a large elongated block of cushioned material, such as a plastic foam material inserted within a casing material which matches the upholstery of the interior of the motor vehicle.

DESCRIPTION OF THE PREFERRED EMBODIMENTS

Figure 1:
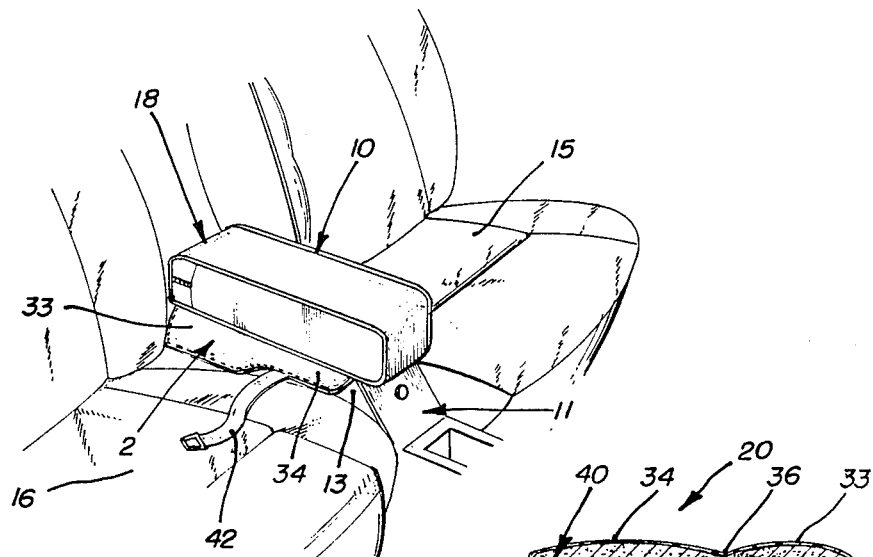
FIG. 1 is a top front perspective view of the arm rest made in accordance with this invention in operative position upon the center console between the front seats of a motor vehicle.
Figure 6:
FIG. 6 is a section taken along the line 6—6 of FIG. 3.
Figure 2:
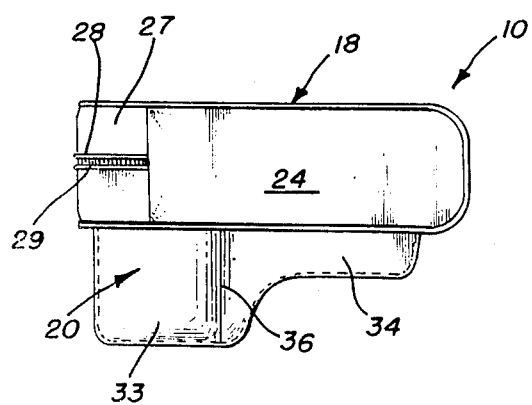
FIG. 2 is an enlarged side elevation of the arm rest disclosed in FIG. 1.
Figure 3:
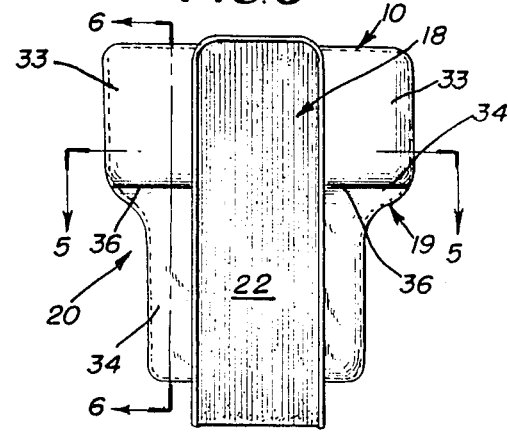
FIG. 3 is a top plan view of the arm rest disclosed in FIG. 2, with the wing flap members extending flat or substantially horizontal.
Figure 4:
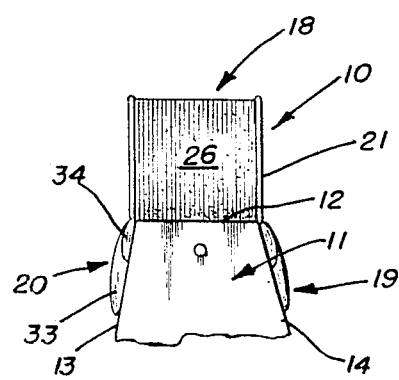
FIG. 4 is a front elevation of the arm rest disclosed in FIG. 2, a console disclosed fragmentarily.
Figure 5:
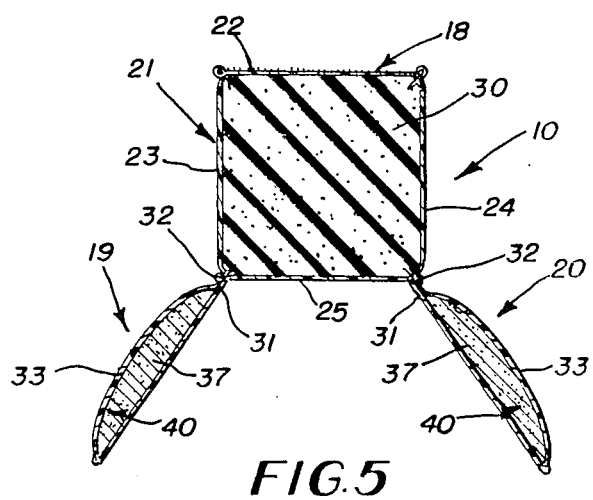
FIG. 5 is an enlarged section taken along the line 5—5 of FIG. 3, with the wing flap members diverging downward.

Referring now to the drawings in more detail, FIG. 1 discloses the arm rest 10 made in accordance with this invention mounted upon an elongated center console 11 having a top surface 12 and opposite side surfaces 13 and 14 between a pair of front seats 15 and 16 of a motor vehicle. It will be noted in FIG. 1 that the front seats 15 and 16 slope downward and rearward to expose more of the rear portions of the sides 13 and 14 of the center console 11 than the front portions.

The arm rest 10 includes an elongated arm rest member 18 and a pair of side depending wing flap members 19 and 20. the arm rest member 18 includes a casing or cover 21 having a top wall or surface 22 and a pair of side walls 23 and 24, as well as a bottom wall 25, a front wall 26, and a rear wall portion 27. The rear wall portion 27 is provided with a horizontal opening 28 provided with a closure member, such as a zipper 29, and large enough to receive an elongated core or block of cushion material, such as the foam block 30.

The top wall or rest surface 22 is made of a soft material which is comfortable to the arm of the occupant of either seat 15 or 16.

The bottom wall 25 of the casing 21 is preferably made of a frictional or anti-skid material, such as rubber, and also which is of a shape having the same contour as the top surface 12 of the center console 11 so that the arm rest member 18 may seat firmly upon and be supported by the top surface 12 of the center console 11. The frictional material of the bottom wall 25 tends to prevent the arm rest member 18 from moving rearward or forward along the top surface 12 of the center console 11.

Each wing flap member 19 and 20 is preferably a mirror-image of the other, and as disclosed in the drawings, is identical to the construction of the other wing flap member. Each wing flap member 19 and 20 has an elongated substantially straight top edge portion 31, which is flexibly secured by heat sealing or stitching 32 to the bottom edge portions of the respective side walls 23 and 24 of the casing 21 to permit limited flexing or pivotal movement between each flap member and the arm rest member 18.

As disclosed in the drawings, each of the wing flap members 19 and 20 is larger or wider in its rear portion 33 than the front portion 34. Each wing flap member 19 and 20 is provided with a weight cavity 35 which may extend longitudinally the full length of each of the corresponding wing flap members 19 or 20. The elongated cavity may be divided by a width-wise seam 36 into two compartments 37 and 38 corresponding to the rear and front portions 33 and 34 of each flap member 19 and 20.

Each of the weight compartments 37 and 38 within each of the rear and front portions 33 and 34 of each of the wing flap members 19 and 20 may be filled with weight members or particles, such as sand 40 or metal pellets, or even liquids, such as water.

The rear portions 33 are deeper or wider than the front portions 34 for two reasons. One reason is that the rear portions of the flap 33 will cover the larger, more exposed rear surfaces of the side walls 13 and 14 of the center console 11. Another reason for having the rear portions 33 deeper or wider than the front portions 34 is to provide free passage for the seat belts 42 beneath the front portions 34.

Also in a preferred form of the invention, the seams 36 are employed to separate the weight compartments 37 and 38 to prevent the weights 40 from excessively shifting from front-to-rear by gravity by virtue of the deeper rear weight compartments 37 when the wing flaps 19 and 20 depend vertically from the arm rest member 18.

The arm rest 10 made in accordance with this invention is designed for use preferably on the center console 11 between the front seats in the cab of a pickup truck, and particularly the 1982-1988 S-10 "Blazer" and the S-15 GMC "Jimmy".

In one embodiment of the arm rest 10, the arm rest member 18 is approximately 16½" long, ½" wide and 4" high. The cushion core or block 30 is preferably made of foam rubber and the bottom wall or surface 25 of the casing 21 is made of a rubberized material for stability and to better grip the top surface 12 of the center console 11. The length of each of the wing flap members 19 and 20 is preferably about 12" and the height or depth of the rear portion 33 of each wing flap member is about 3½".

The casing 21 may be made of any desired material which will adequately contain the cushion core or block 30 and which will be comfortable to support the arm of the occupant of either one of the seats 15 or 16. It is desirable to make the casing 21 from a material and color which matches the interior upholstery and coloring of the vehicle.

The arm rest 10 is portable and separable from the console 11 and the seats 15 and 16 so that the arm rest 10 may be quickly removed when it is desired to open the top of the console 11 to gain access to the contents of the console. Moreover, the portable arm rest 10 may be quickly installed or seated upon the console, or readily removed and transferred to another console in another vehicle or be transported to a storage area.

What is claimed is:

1. In a motor vehicle having a center console including an elongated top surface extending front-to-rear and depending side surfaces between a pair of seats, an arm rest comprising:
   (a) an elongated arm rest member comprising a cushion material, an elongated top rest surface, opposed sides, and an elongated bottom support surface having substantially the same contour as the top surface of said center console for seating on and straddling said console,
   (b) a pair of elongated wing flap members, each having front and rear portions, top and bottom edge portions, and a widthwise dimension between said top and bottom edge portions,
   (c) means securing said top edge portions to corresponding opposite sides of said arm rest members so that said wing flap members freely depend from said corresponding opposite sides when said arm rest member is seated in an operative position upon said center console,
   (d) each of said rear portions of said wing flap members having a width greater than the width of each of said front portions, said rear portions depending farther down than said front portions on opposite sides of said arm rest member when said arm rest member is in said operative position on said center console,
   (e) each of said rear portions and said front portions in both said wing flap members having a separate independent weight compartment, and
   (f) weight means within each of said compartments, said weight means having a front-to-rear weight distribution for holding said arm rest member in said operative position on said center console.

2. The invention according to claim 1 in which said arm rest member comprises an elongated block of said cushion material, and a casing covering said block.

* * * * *